United States Patent [19]

Zhang et al.

[11] Patent Number: 5,677,085
[45] Date of Patent: Oct. 14, 1997

[54] ELECTRODE MATERIALS FOR ELECTROCHEMICAL CELLS AND METHOD OF MAKING SAME

[75] Inventors: Jinshan Zhang, Duluth; Anaba A. Anani, Norcross, both of Ga.

[73] Assignee: Motorola, Inc., Schaumburg, Ill.

[21] Appl. No.: 792,420

[22] Filed: Feb. 3, 1997

Related U.S. Application Data

[62] Division of Ser. No. 575,653, Dec. 20, 1995.
[51] Int. Cl.$^6$ .................................................... H01M 4/58
[52] U.S. Cl. ............................................. 429/218; 204/294
[58] Field of Search ............................. 429/218; 204/294

[56] References Cited

U.S. PATENT DOCUMENTS

| | | | |
|---|---|---|---|
| 5,093,216 | 3/1992 | Azuma et al. | 429/218 |
| 5,378,561 | 1/1995 | Furukawa et al. | 429/218 |
| 5,536,597 | 7/1996 | Takahashi et al. | 429/194 |

FOREIGN PATENT DOCUMENTS 0 541 889 A1  5/1993  European Pat. Off. .

*Primary Examiner*—Bruce F. Bell
*Attorney, Agent, or Firm*—Kenneth M. Massaroni

[57] ABSTRACT

A method for preparing a carbon material for use as an electrode, such as the anode (30) of an electrochemical cell (10). The carbon is fabricated in a heating process from a plurality multifunctional organic monomers selected from first and second groups of monomers. Electrodes so fabricated may be incorporated into electrochemical cells (10) as the anode (20) thereof.

6 Claims, 10 Drawing Sheets

ELECTRODE MATERIALS FOR ELECTROCHEMICAL CELLS AND METHOD OF MAKING SAME

This is a Divisional application under §1.60 of pending U.S. patent application Ser. No. 08/575,653 filed Dec. 20, 1995 and assigned to Motorola, Inc.

CROSS REFERENCE TO RELATED APPLICATIONS

This application is related to U.S. Ser. No. 08/534,427, filed Sep. 27, 1995, in the names of Zhang, et al, and assigned to Motorola, Inc., the disclosure of which is incorporated herein by reference.

TECHNICAL FIELD

This invention relates in general to the field of electrodes and electrode materials for electrochemical cells, and in addition, to methods of synthesizing said electrodes and electrode materials.

BACKGROUND OF THE INVENTION

As electronic devices and other electrical apparatuses increasingly become portable, advances must be made in energy storage systems to enable such portability. Indeed, it is often the case with current electronics technology that the limiting factor to portability of a given device is the size and weight of the associated energy storage device. Obviously, a small energy storage device may be fabricated for a given electrical device, but at the cost of energy capacity. Conversely, a long-lasting energy source can be built, but it is then too large to be comfortably portable. The result is that the energy source is either too bulky, too heavy, or it doesn't last long enough. The main energy storage device used for portable electronics is the electrochemical battery cell, and less frequently, the electrochemical capacitor.

Numerous different battery systems have been proposed for use over the years. Early rechargeable battery systems included lead-acid, and nickel-cadmium (Nicad), each of which have enjoyed considerable success in the marketplace. Lead-acid batteries, because of their ruggedness and durability, have been the battery of choice in automotive and heavy industrial applications. Conversely, Nicads have been preferred for smaller or portable applications. More recently, nickel metal hydride systems (NiMH) have found increasing acceptance for both large and small applications.

Notwithstanding the success of the aforementioned battery systems, other new batteries are appearing on the horizon which offer the promise of better capacity, better power density, and longer cycle life as compared with the current state of the art. The first such system to reach the market is the lithium ion battery, which is already finding its way into consumer products. Lithium polymer batteries are also receiving considerable attention, though have not yet reached the market.

Lithium ion batteries in general include a positive electrode or cathode fabricated of a transition metal oxide material, and a negative electrode or anode fabricated of an activated carbon material such as graphite or petroleum coke. New materials for both electrodes have been investigated intensely because of their high potential gravimetric energy density. To date, however, most of the attention has been focused on the transition metal oxide electrode.

Activated carbon materials are routinely prepared by using difunctional monomers as polymer precursors. Examples of such precursors include resins of furfuryl alcohol, phenol, formaldehyde, acetone-furfural, or furfural alcohol-phenol copolymer. These precursors are disclosed in, for example, U.S. Pat. No. 5,378,561, to Furukawa, et al. Other precursors include polyacrylonitrile and rayon polymers, as disclosed in Jenkins, et al, *Polymeric Carbons-Carbon Fibre, Glass and Char*, Cambridge University Press, Cambridge, England (1976). These precursors are then subjected to a process of curing and carbonizing, usually very slowly, and at temperatures of up to 2,000° C. Two major steps are involved in these processes: (1) synthesis of polymer precursors from difunctional monomers via wet chemistry; and (2) pyrolysis of the precursors. The method typically results in a relatively low overall yield due to the two step process. For example, conventional processing of polyacrylonitrile typically yields only about 10% of a usable carbonaceous material. Further, many impurities may be incorporated into the carbonaceous material, deleteriously effecting the electrochemical properties.

Accordingly, there exists a need for an improved, carbon material for use in electrochemical cell applications. The material should be easily manufactured in a simple, high yield method.

DETAILED DESCRIPTION OF THE PREFERRED EMBODIMENT

Figure 1:
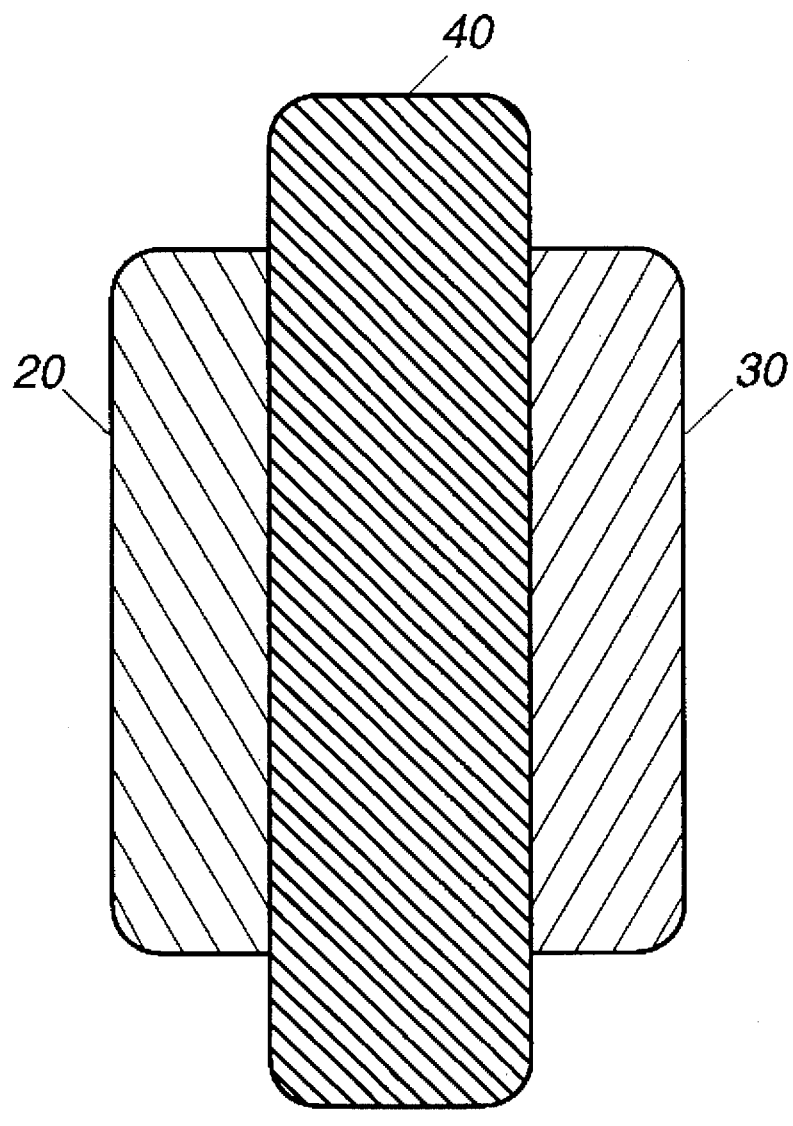
FIG. 1 is a schematic representation of an electrochemical cell including an electrode fabricated of carbon electrode material, in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a schematic representation of an electrochemical cell 10 such as a battery or an electrochemical capacitor, and including an amorphous carbon or carbon-based electrode fabricated in accordance with the instant invention. The electrochemical cell includes a positive electrode or cathode 20, a negative electrode or anode 30 and an electrolyte 40 disposed therebetween. The cell negative electrode 30 is fabricated of a substantially amorphous carbon or carbon-based material such as that described in greater detail hereinbelow. The positive electrode 20 of the cell 10 may be fabricated from a lithiated transition metal oxide such as are well known in the art. Alternatively, the positive electrode material may be fabricated of a material such as that described in commonly assigned, co-pending patent application Ser. No. 08/464,440 filed Jun. 5, 1995, in the name of Mao, et al, and entitled "Positive Electrode Materials for Rechargeable Electrochemical Cells and Method of Making Same", the disclosure of which is incorporated herein by reference.

The electrolyte 40 disposed between the electrodes may be a polymer electrolyte, comprising a polymeric support, having dispersed therein an electrolyte active species such as, for example, $LiClO_4$ in propylene carbonate, or polyethylene oxide impregnated with a lithiated salt. Alternatively, the electrolyte may be similar to that described in commonly assigned, co-pending application Ser. No. 08/518,732 filed Aug. 24, 1995 to Oliver, the disclosure of which is incorporated herein by reference. The electrolyte 40 may also act as a separator between the positive and negative electrodes. The electrolyte may be aqueous, non-aqueous, solid state, gel, or some combination thereof.

In accordance with the instant invention, there is provided a substantially amorphous carbon or carbon-based material for use as an electrode in an electrochemical device such as a battery, and a method for making said material. The carbon-based materials are substantially amorphous, though may be partially or completely crystalline or include crystalline inclusions if desired, and may include an amount of one or more modifiers. The exact nature of the modifiers is dependent upon the specific application contemplated, as will be described below.

Instead of the difunctional monomer precursors used in the prior art, the instant invention uses one or more multifunctional organic monomers. More specifically, the multifunctional organic monomers are divided into two groups (Monomer A & Monomer B), at least one monomer being selected from each group. The monomers have the general formulas of:

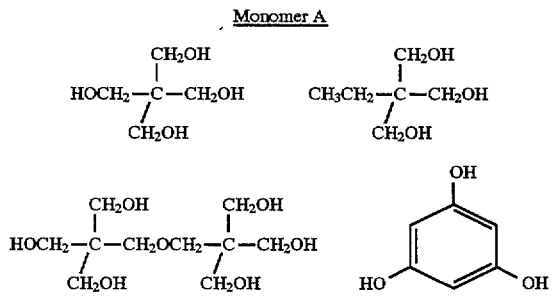

Monomer A

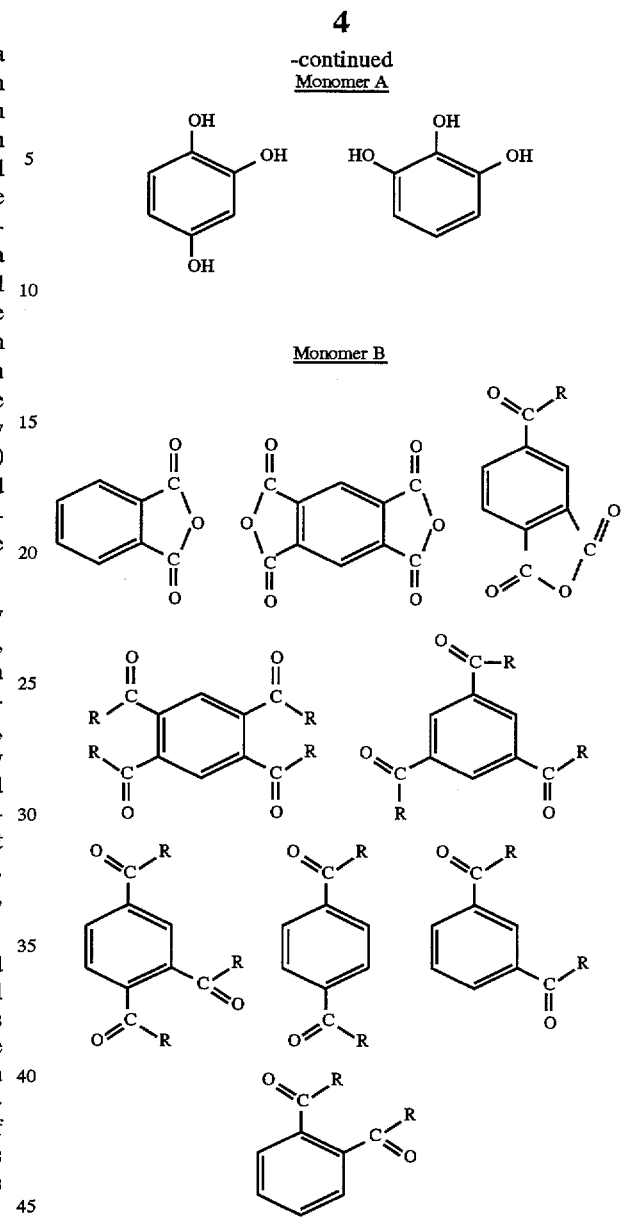

Where R is selected from the groups of Cl, OH, H, $OC_nH_{2n+1}$(n=1 to 10, and preferably 4 or less,), and combinations thereof.

Indeed, where in the prior art a single organic monomeric precursor is used, the instant invention contemplates fabricating the carbon materials from two or more than two multifunctional organic monomers, at least one of which is selected from each of the two groups described above. In one preferred embodiment, one of the organic precursor monomers has at least three functional groups, which functional groups allow for crosslinking in the curing process. More particularly, first and second multifunctional organic monomers are cured or crosslinked in the presence of heat and/or a catalyst, as is described in greater detail hereinbelow. Following the curing process, the crosslinked multifunctional organic monomers are subjected to a solid state carbonization process described in greater detail hereinbelow. The result of the solid state carbonization process is the amorphous carbon electrode material.

Preferred examples of organic monomers which can be used in connection with the instant invention include, from Monomer Group A pyrogallol, phloroglucinol, 1,2,4-benzenetriol, dipentaerythritol, pentaerythritol, trimethyl oylpropane, and combinations thereof. Preferred compounds from monomer Group B include 1,3,5-benezenetricarbonyl trichloride, terephthaloyl chloride, dimethyl isophthalate, dimethyl terephthlate, isophthaloyl chloride, terephthalic acid, isophthalic acid, 1,3,5-benzenetricarboxylic acid, 1,2,4-benzenetricarboxylic anhydride, 1,2,4,5-benzenetetracarboxylic acid, 1,2,4,5-benzenetetracarboxylic dianhydride, and combinations thereof. Other multifunctional organic monomers which conform to the formulas described hereinabove may be employed equally advantageously, without departing from the spirit or scope hereof.

The carbon electrode materials resulting from the processing of the organic monomer precursors described hereinabove are characterized by X-ray diffraction patterns which individually show a (002) peak, the d-spacings of which (002) peaks ($^d$002) are between 3.72 Å to 4.20 Å. Further, the optimum peak ratio of the (002) peak to the (100) peak is between 1 and 5, and preferably between 2.25 and 2.75. Since the carbon materials are essentially amorphous in nature, the X-ray diffraction peaks are broader than in crystalline materials. This will be illustrated in the examples below.

With respect to the fabrication of carbon electrode materials, it has been found that when the multifunctional organic monomers are heated in the presence of an acid, the reaction of the monomer may be more complete, and may result in an improved yield of the final product. Hence, the amorphous carbon electrode material may be formed with an acid present. Examples of preferred acids include acids selected from the group consisting of acetic acid, boric acid, phosphoric acid, p-toluenesulfonic acid, 4-amino benzoic acid, trifluoroacetic acid, benzenesulfonic acid, and combinations thereof. The acid may be present in amounts between 1 and 25% weight percent.

The carbon material may also include one or more modifiers incorporated into the carbon matrix. The modifiers may be selected from the group consisting of lithium alloying elements such as Sn, Si, Al, and others known in the art, and combinations thereof, and electrode performance enhancing elements such as B, N, Ti, V, and combinations thereof.

In the preparation of the amorphous carbon material, it is contemplated that the multifunctional organic monomers are heated, along with the add catalyst, in an inert environment. Preferred inert gas environments include, for example, nitrogen, argon, and helium. The materials are heated at temperatures sufficient to induce a solid state carbonization of the multifunctional monomers. This process is similar in nature to a sublimation process, and occurs at temperatures of less than about 1200° C., and preferably about 1000° C.

The amorphous carbon electrode material is the pyrolytic by-product of the multifunctional organic monomers. The multifunctional monomers are cured or polymerized at lower temperatures. Once polymerized, the multifunctional monomers form a cured, crosslinked polymer which subsequently carbonizes at higher temperatures to form the carbon electrode material. As the multifunctional organic monomers generally contain the elements of carbon, hydrogen, oxygen, and nitrogen in varying combinations, the carbonization process refers to the fact that the cross-linked organic precursors decompose, evolving compounds including carbon-oxygen, carbon-hydrogen, hydrogen-oxygen, nitrogen-hydrogen, and other similar compounds. The remaining carbon atoms condense into planar structures terminating predominantly with edge hydrogen atoms.

The fabrication process may be understood from the following:

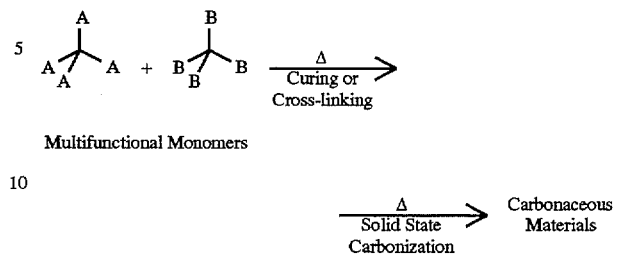

Multifunctional Monomers wherein Monomer A and Monomer B are selected from the groups described above.

Upon further heating, the cross-linked polymer resulting from the curing process decomposes and forms carbon-carbon bonds between the phenyl rings of the starting monomers. As the temperature increases up to, for example, 500°–700° C., the six carbon phenyl rings start to break and form a layered carbon network. The formation of hyperbranched carbon polymers in the first stage of the process results in moving the monomer molecules physically closer to one another, thus facilitating carbonization in the second step of the process. This also accounts, at least partially, for improved yields as compared to the prior art.

Figure 2:
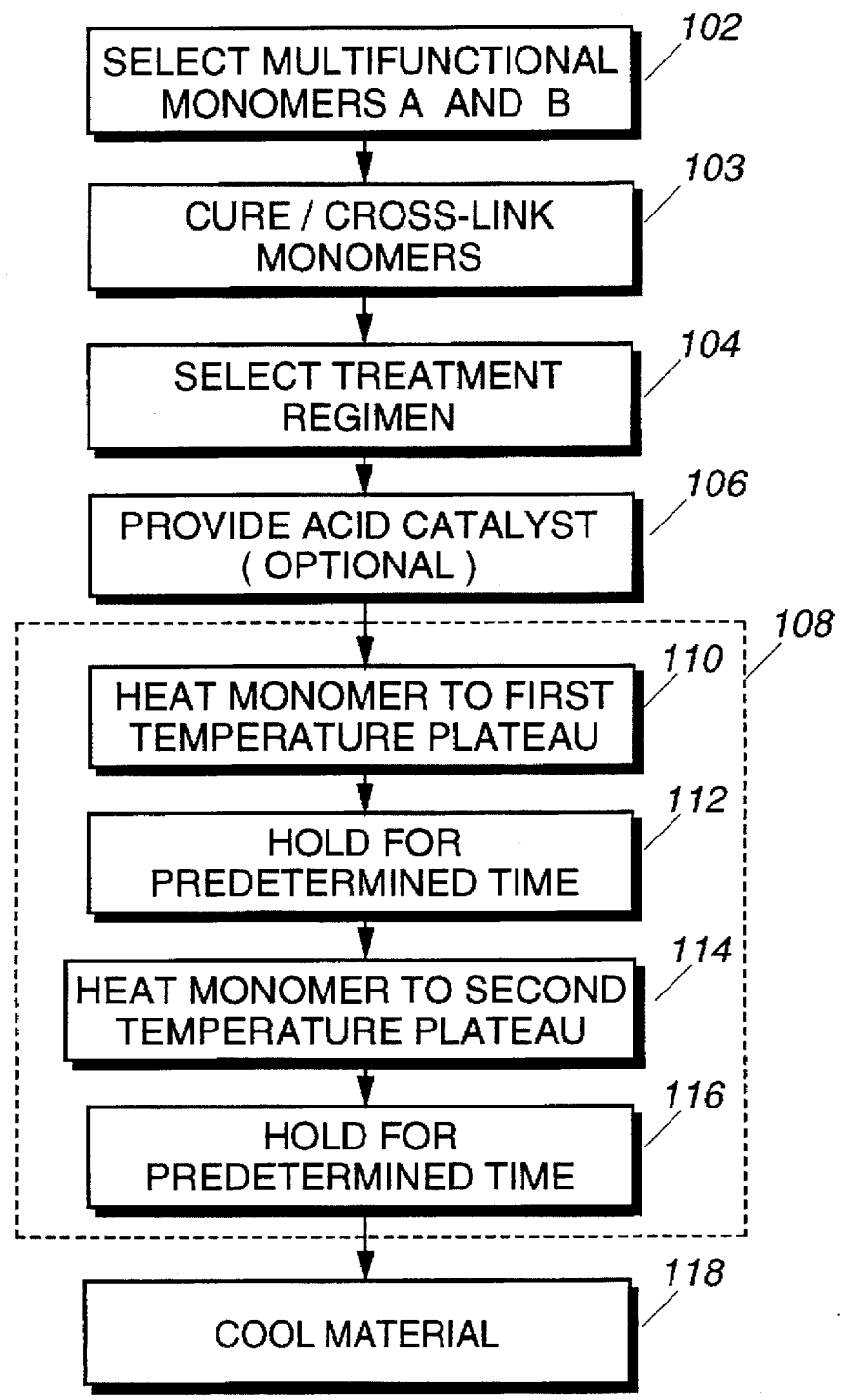
FIG. 2 is a flowchart illustrating the steps for preparing a carbon electrode material, in accordance with the instant invention.

Referring now to FIG. 2, there is illustrated therein a flow chart 100 describing the steps for preparing the amorphous carbon electrode material described above. The first step illustrated in FIG. 2 is shown in box 102, and comprises the step of selecting appropriate multifunctional organic monomers from each group. Thereafter, as illustrated in box 103, the two or more organic monomers are cured or cross-linked by heating. Then, as illustrated in box 104, is the step of selecting the treatment temperature ranges for the solid state carbonization process for the selected monomers. More particularly, the yield of the amorphous carbon material from a particular multifunctional monomer will depend in part on the thermal regime to which the monomer is subjected. Thermogravimetric analysis (TGA) and differential scanning calorimetry (DSC) each provide means by which to determine the processing temperature regime. The results have generally indicated that the solid state carbonization process should be a two temperature, one-step heating process.

Specifically, TGA & DSC indicate the temperature at which condensation and reduction of the multifunctional monomers occur. Hence, using such analysis as described in commonly assigned, copending application Ser. No. 08/534,427, referred to above, a heating regime is selected.

Returning now to FIG. 2, the next step in the fabrication process of flow chart 100 is illustrated in box 106, and comprises the step of mixing the multifunctional organic monomers with an acid selected from the group of acids described above. The materials should be mixed thoroughly, and further may be dried, as in a drying oven, prior to subjecting the mixture to the solid state carbonization process. It is to be noted that the organic monomers may be mixed with or without the acid, in the presence of an organic solvent such as tetrahydrofuran, acetonitrile, methyl sulfoxide, and combinations thereof.

The next step illustrated in FIG. 2 is the solid state carbonization process 108, which may comprise a multi-step heating regime. As illustrated in FIG. 2, step 108 actually comprises four steps illustrated by boxes 110, 112, 114, and 116. Each step in the carbonization process will depend upon the DSC and TGA testing described above. Generally however, the step illustrated by box 110 comprises the step of heating the dried monomers and optional acid to a first temperature at a predetermined rate of X° C./minute. Once the desired temperature is reached, the mixture is held at that temperature for a predetermined time period, as illustrated in box 112.

Thereafter, the material is heated to a second, typically higher temperature, at a rate of X° C./minute, as illustrated in box 114. Once the second desired temperature is reached, the mixture is held at that temperature for a predetermined time period, as illustrated in box 116. After solid state carbonization is completed, the resulting carbon electrode material is cooled slowly as illustrated in box 118.

The instant invention may be better understood from the examples provided below.

EXAMPLES

Each of the following examples provide X-ray diffraction analysis using a $CuK_\alpha$ source, where $\lambda=1.54$ Å source. Degrees $2\theta$ are plotted on the abscissa, and intensity is plotted on the ordinate. Peak values were calculated using Bragg's Law, i.e., $d=\lambda/2 \sin \theta$

EXAMPLE 1

Figure 3:
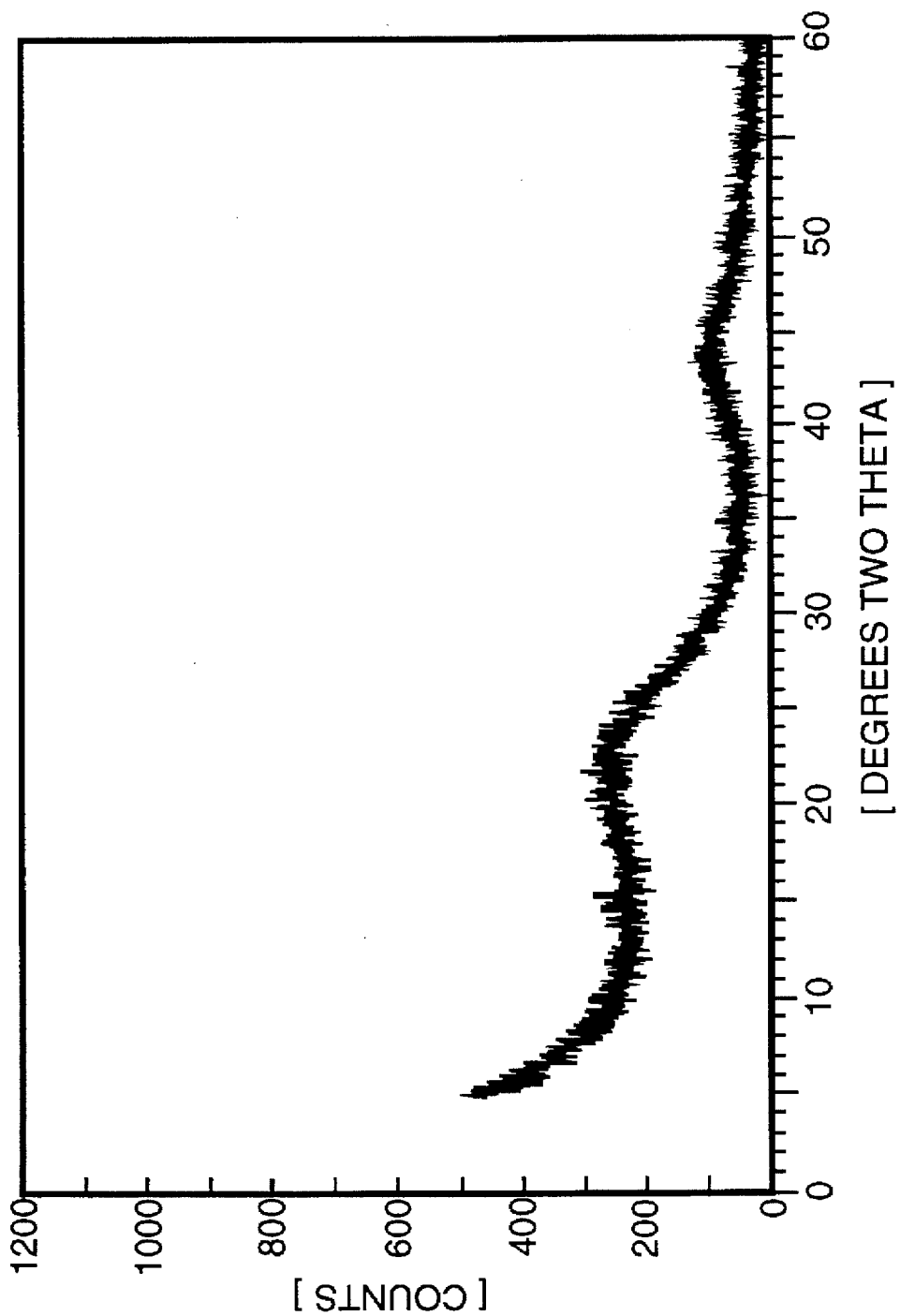
FIG. 3 is a X-ray diffraction pattern of an amorphous carbon electrode material, in accordance with the instant invention.

To 1,3,5-benzenetricarbonyl trichloride (16.8 g) solution in tetrahydrofuran was added pentaerythritol powder (8.04 g). The mixture was dried and cured at 100° C. for 12 hours. The cured polymer was then carbonized according to the following heating program in an inert gas atmosphere of argon: (1) 100° C. to 260° C. at 1° C./min; (2) hold at 260° C. for 6 hours; (3) from 260° C. to 800° C. at 10° C./min; (4) hold at 800° C. for 1 hour. 6.41 g of carbon electrode material was collected. FIG. 3 is an X-ray diffraction pattern for the material of this example, and shows a broad (002) peak centered at 4.03 Å. FIG. 3 also shows an intensity peak ratio of $$\frac{I_{(002)}}{I_{(100)}}$$

of 2.48. The reversible lithium intercalation capacity of the material was 520 mAh/g.

EXAMPLE 2

Figure 4:
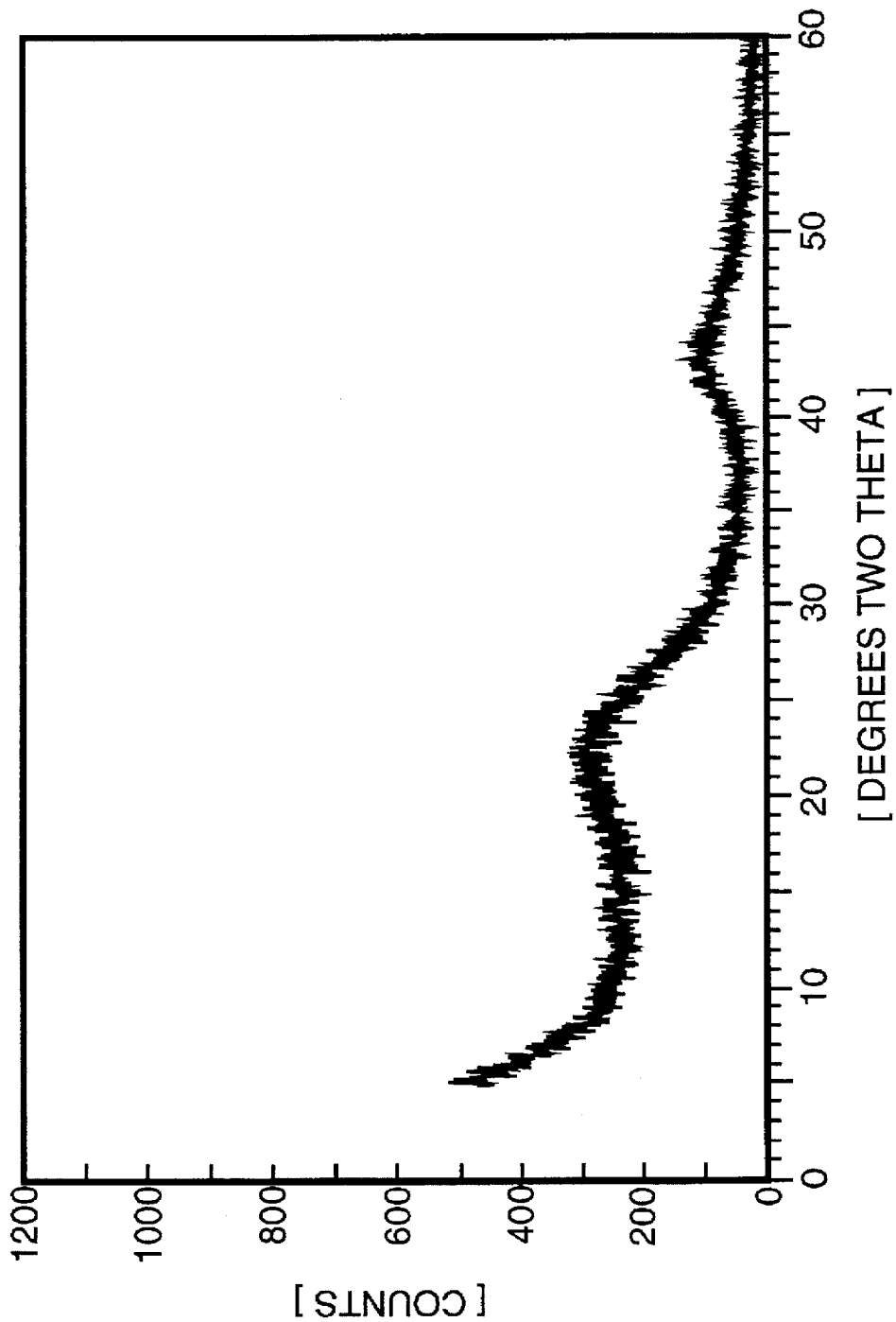
FIG. 4 is a X-ray diffraction pattern of a second amorphous carbon electrode material, in accordance with the instant invention.

To 1,3,5-benzenetricarbonyl trichloride (16.8 g) solution in tetrahydrofuran was added pentaerythritol powder (8.04 g). The mixture was dried and cured at 100° C. for 12 hours. The cured polymer was then carbonized according to the following heating program in an inert gas atmosphere of argon: (1) 100° C. to 260° C. at 1° C./min; (2) hold at 260° C. for 6 hours; (3) from 260° C. to 1000° C. at 10° C./min; (4) hold at 1000° C. for 1 hour. 6.02 g of carbon electrode material was collected. FIG. 4 is an X-ray diffraction pattern for the carbon material of this example, and shows a broad (002) peak in the range of 4.06 to 3.90 Å, and centered at 4.00 Å. FIG. 4 also shows an intensity peak ratio of $$\frac{I_{(002)}}{I_{(100)}}$$

of 2.25. The reversible lithium intercalation capacity of the material was 480 mAh/g.

EXAMPLE 3

Figure 5:
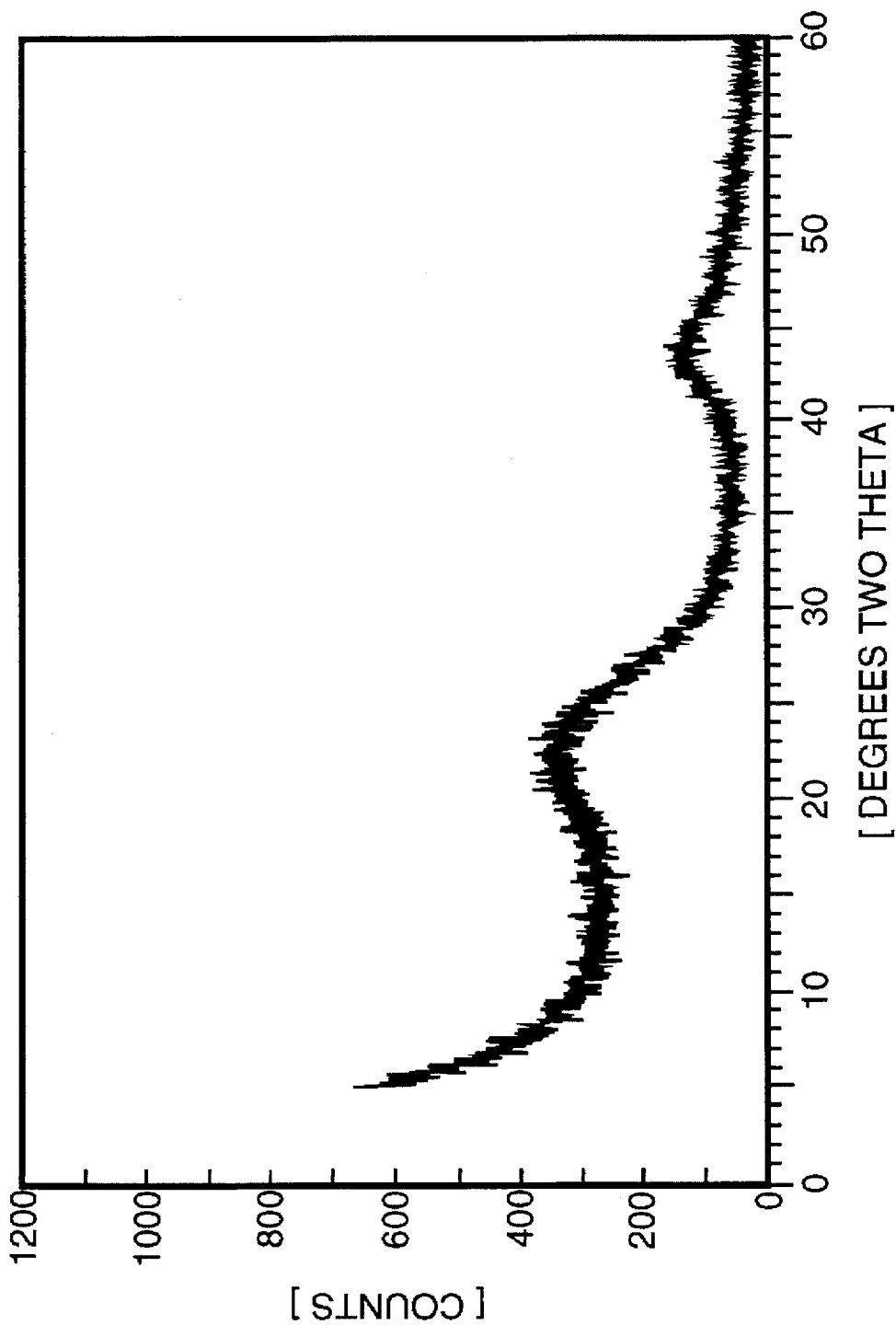
FIG. 5 is a X-ray diffraction pattern of a third amorphous carbon electrode material, in accordance with the instant invention.

To 1,3,5-benzenetricarbonyl trichloride (16.8 g) solution in tetrahydrofuran was added pentaerythritol powder (8.04 g). The mixture was dried and cured at 100° C. for 12 hours. The cured polymer was then carbonized according to the following heating program in an inert gas atmosphere of argon: (1) 100° C. to 260° C. at 1° C./min; (2) hold at 260° C. for 6 hours; (3) from 260° C. to 1100° C. at 10° C./min; (4) hold at 1100° C. for 1 hour. 6.00 g of carbon electrode material was collected. FIG. 5 is an X-ray diffraction pattern for the material of this example, and shows a broad (002) peak centered at at 3.95 Å. FIG. 5 also shows an instensity peak ratio of $$\frac{I_{(002)}}{I_{(100)}}$$

of 2.48. The reversible lithium intercalation capacity of the material was 470 mAh/g.

TABLE 1

Summary of experimental results for the carbon electrode material made from 1,3,5-benzenetricarbonyl trichloride and pentaerythritol

| Sample No. | 1 | 2 | 3 |
|---|---|---|---|
| d-spacing of (002) (Å) | 4.03 | 4.00 | 3.95 |
| peak ratio of (002) to (100) | 2.48 | 2.25 | 2.48 |
| Capacity (mAh/g) | 520 | 480 | 470 |

EXAMPLE 4

Figure 6:
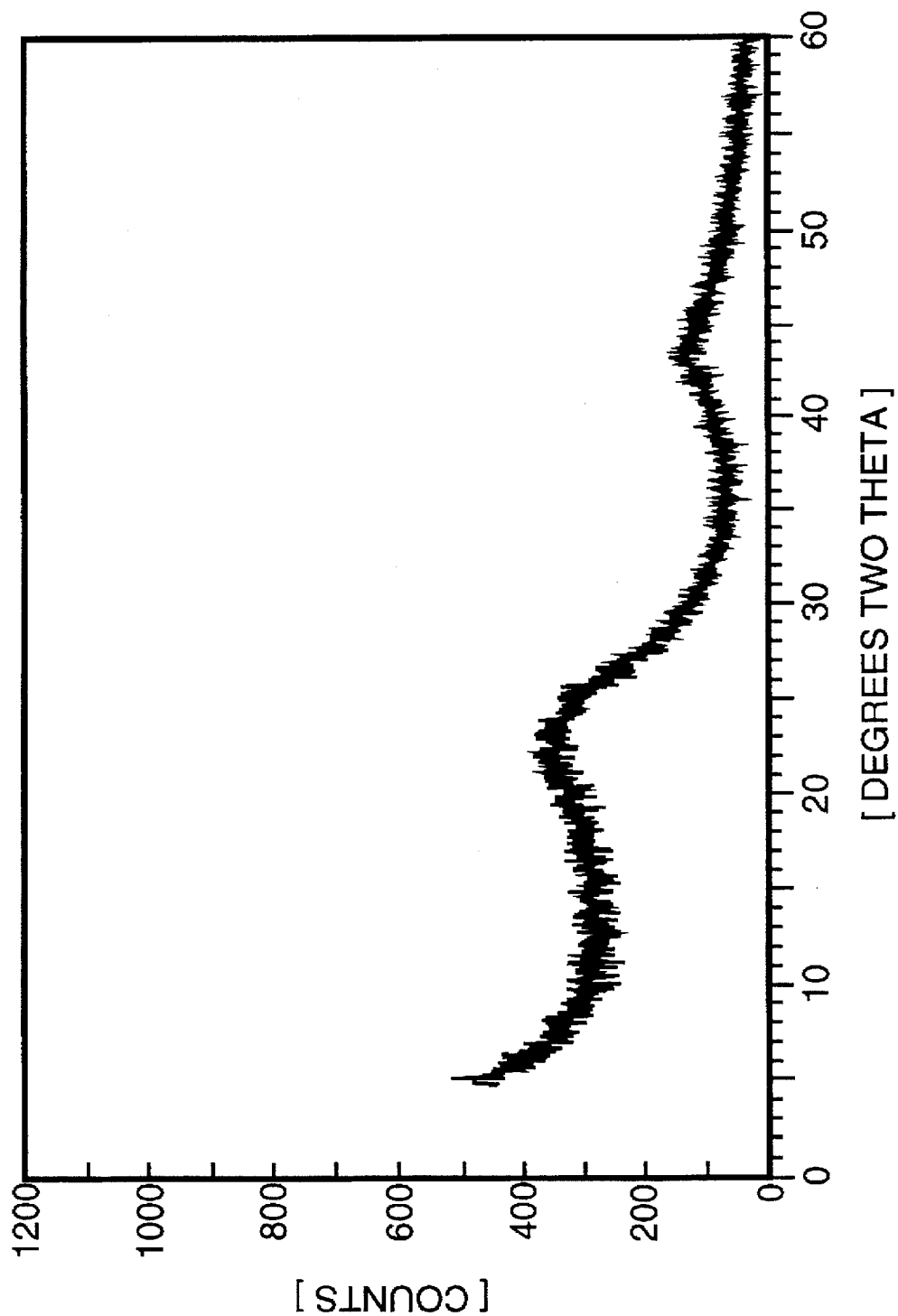
FIG. 6 is a X-ray diffraction pattern of a fourth amorphous carbon electrode material, in accordance with the instant invention.

Terephthaloyl chloride (24.04 g) and pentaerythritol powder (8.00 g) were mixed in a ball mill. The mixture was placed in a ceramic crucible and cured at 100° C. for 12 hours. The cured polymer was then carbonized according to the following heating program in an inert gas atmosphere of argon: (1) 100° C. to 260° C. at 1° C./min; (2) hold at 260° C. for 6 hours; (3) from 260° C. to 800° C. at 10° C./min; (4) hold at 800° C. for 6 hours. 5.31 g of carbon electrode material were collected. FIG. 6 is an X-ray diffraction pattern for the material of this example, and shows a broad (002) peak centered at at 3.89 Å. FIG. 6 also shows an intensity peak ratio of $$\frac{I_{(002)}}{I_{(100)}}$$

of 2.65. The reversible lithium intercalation capacity of the material was 470 mAh/g.

EXAMPLE 5

Figure 7:
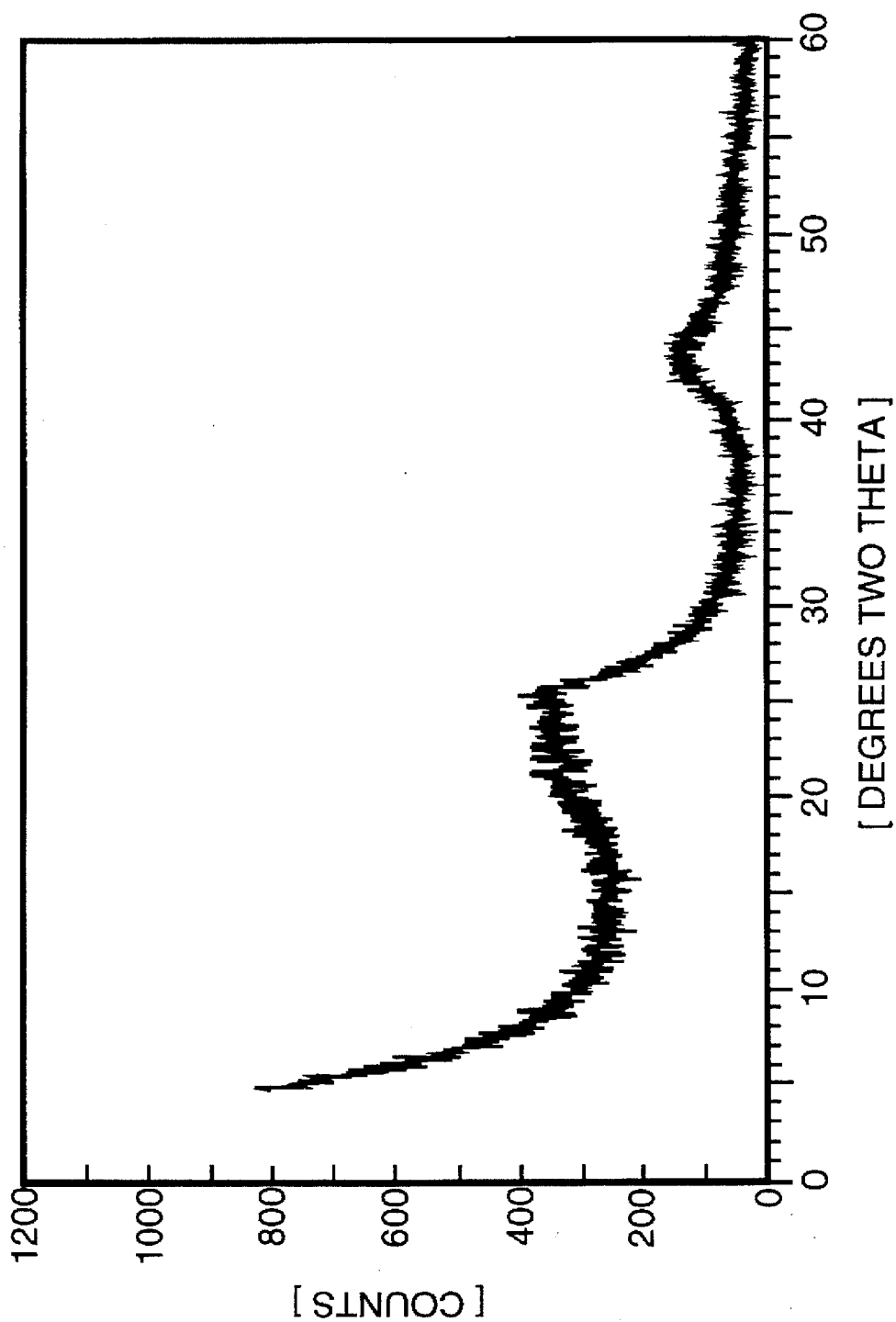
FIG. 7 is a X-ray diffraction pattern of a fifth amorphous carbon electrode material, in accordance with the instant invention.

Terephthaloyl chloride (24.04 g) and pentaerythritol powder (8.00 g) were mixed in a ball mill. The mixture was placed in a ceramic crucible and cured at 100° C. for 12 hours. The cured polymer was then carbonized according to the following heating program in an inert gas atmosphere of argon: (1) 100° C. to 260° C. at 1° C./min; (2) hold at 260° C. for 6 hours; (3) from 260° C. to 1000° C. at 10° C./min; (4) hold at 1000° C. for 6 hours. 5.01 g of carbon electrode material was collected. FIG. 7 is an X-ray diffraction pattern for the material of this example, and shows a broad (002) peak centered at at 3.95 Å. FIG. 7 also shows an intensity peak ratio of $$\frac{I_{(002)}}{I_{(100)}}$$

of 2.25. The reversible lithium intercalation capacity of the material was 430 mAh/g.

EXAMPLE 6

Figure 8:
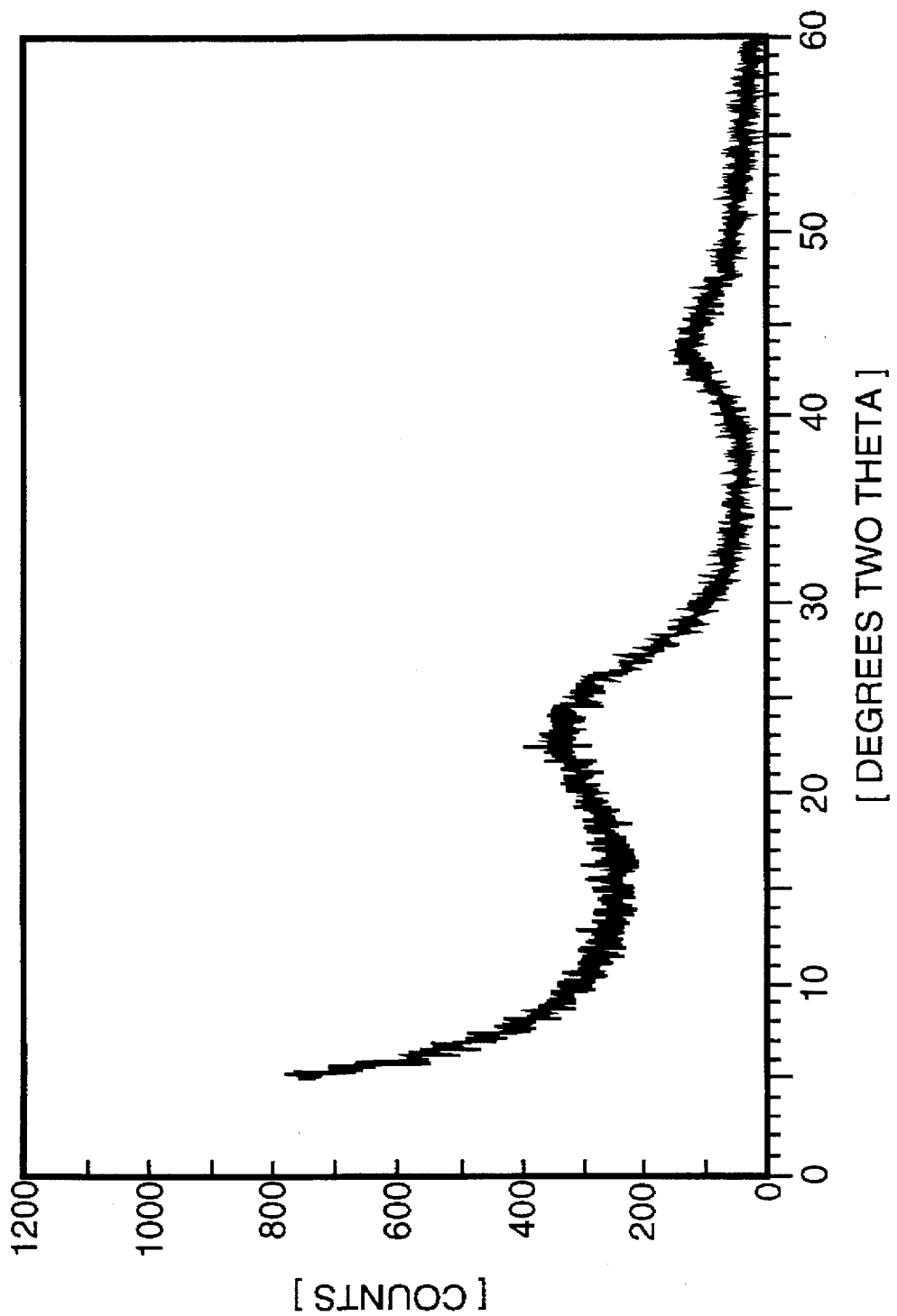
FIG. 8 is a X-ray diffraction pattern of a sixth amorphous carbon electrode material, in accordance with the instant invention.

Terephthaloyl chloride (24.04 g) and pentaerythritol powder (8.00 g) were mixed in a ball mill. The mixture was placed in a ceramic crucible and cured at 100° C. for 12 hours. The cured polymer was then carbonized according to the following heating program in an inert gas atmosphere of argon: (1) 100° C. to 260° C. at 1° C./min; (2) hold at 260° C. for 6 hours; (3) from 260° C. to 1200° C. at 10° C./min; (4) hold at 1200° C. for 6 hours. 4.85 g of carbon electrode material was collected. FIG. 8 is an X-ray diffraction pattern for the material of this example, and shows a (002) peak in the range of 4.92 to 3.79 Å, and centered at at 3.95 Å. FIG. 8 also shows an intensity peak ratio of $$\frac{I_{(002)}}{I_{(100)}}$$

of 2.25. The reversible lithium intercalation capacity of the material was 420 mAh/g.

TABLE 2

Summary of experimental results for the carbon electrode material made from terephthaloyl chloride and pentaerythritol

| Sample No. | 4 | 5 | 6 |
| --- | --- | --- | --- |
| d-spacing of (002) (Å) | 3.93 | 3.89 | 3.86 |
| peak ratio of (002) to (100) | 2.65 | 2.25 | 2.25 |
| Capacity (mAh/g) | 470 | 430 | 420 |

EXAMPLE 7

Figure 9:
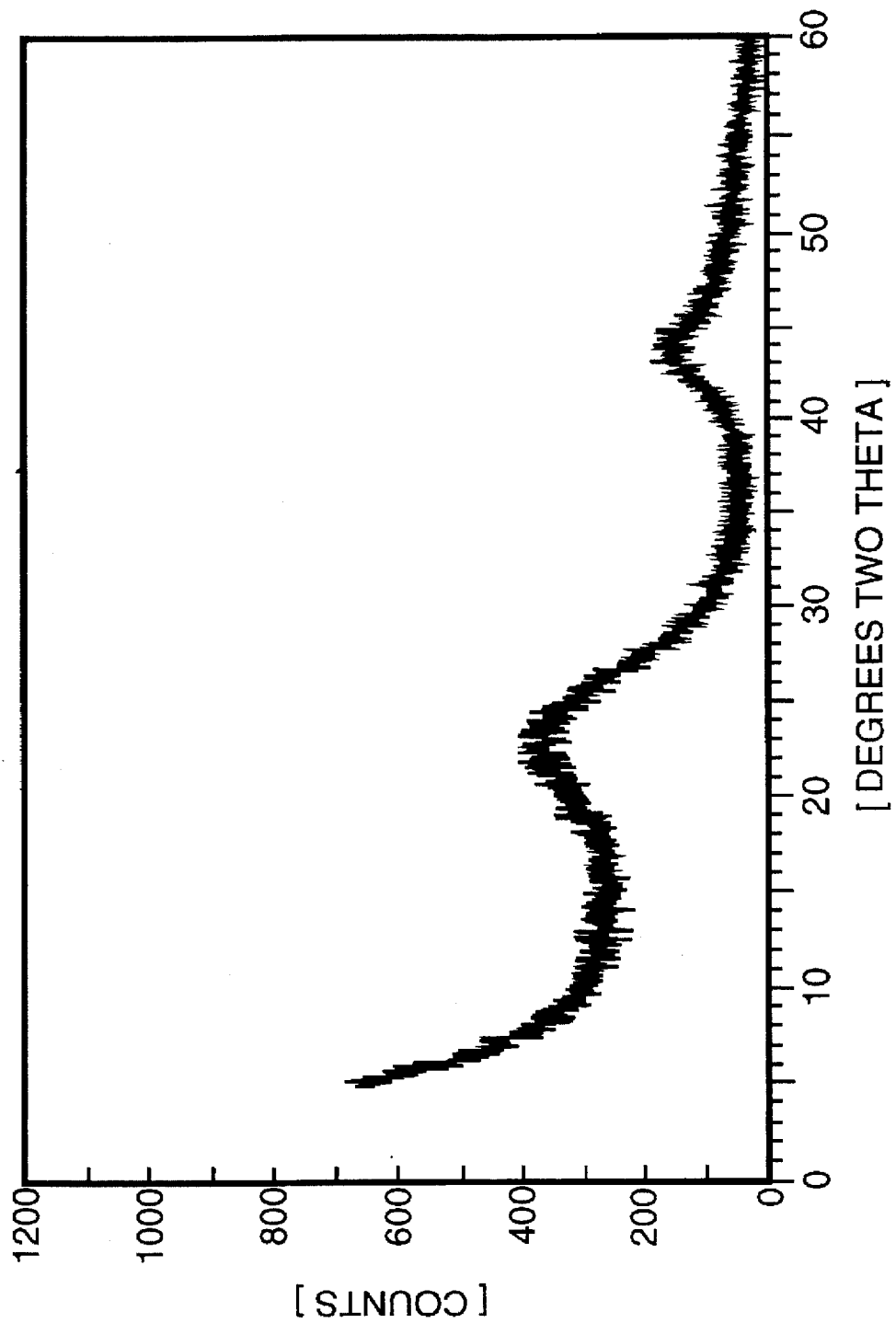
FIG. 9 is a X-ray diffraction pattern of a seventh amorphous carbon electrode material, in accordance with the instant invention.

Dimethyl isophthalate (19.4 g), pentaerythritol powder (6.80 g), and p-toluenesulfonic acid (1.94 g) were mixed and placed in a ceramic crucible. After heating at 80° C. for about 30 minutes, the mixture became a viscous liquid. The liquid was subsequently cured at 130° C. for 12 hours. The cured polymer was carbonized according to the following heating program in an inert gas atmosphere of argon: (1) 130° C. to 600° C. at 0.5° C./min; (2) from 600° C. to 1100° C. at 10° C./min; (4) hold at 1100° C. for 1 hour. 4.05 g of carbon electrode material was collected. FIG. 9 is an X-ray diffraction for the material of this example, and shows a broad (002) peak centered at 3.95 Å. FIG. 9 also shows an intensity peak ratio of $$\frac{I_{(002)}}{I_{(100)}}$$

of 2.43. The reversible lithium intercalation capacity of the material was 340 mAh/g.

EXAMPLE 8

Figure 10:
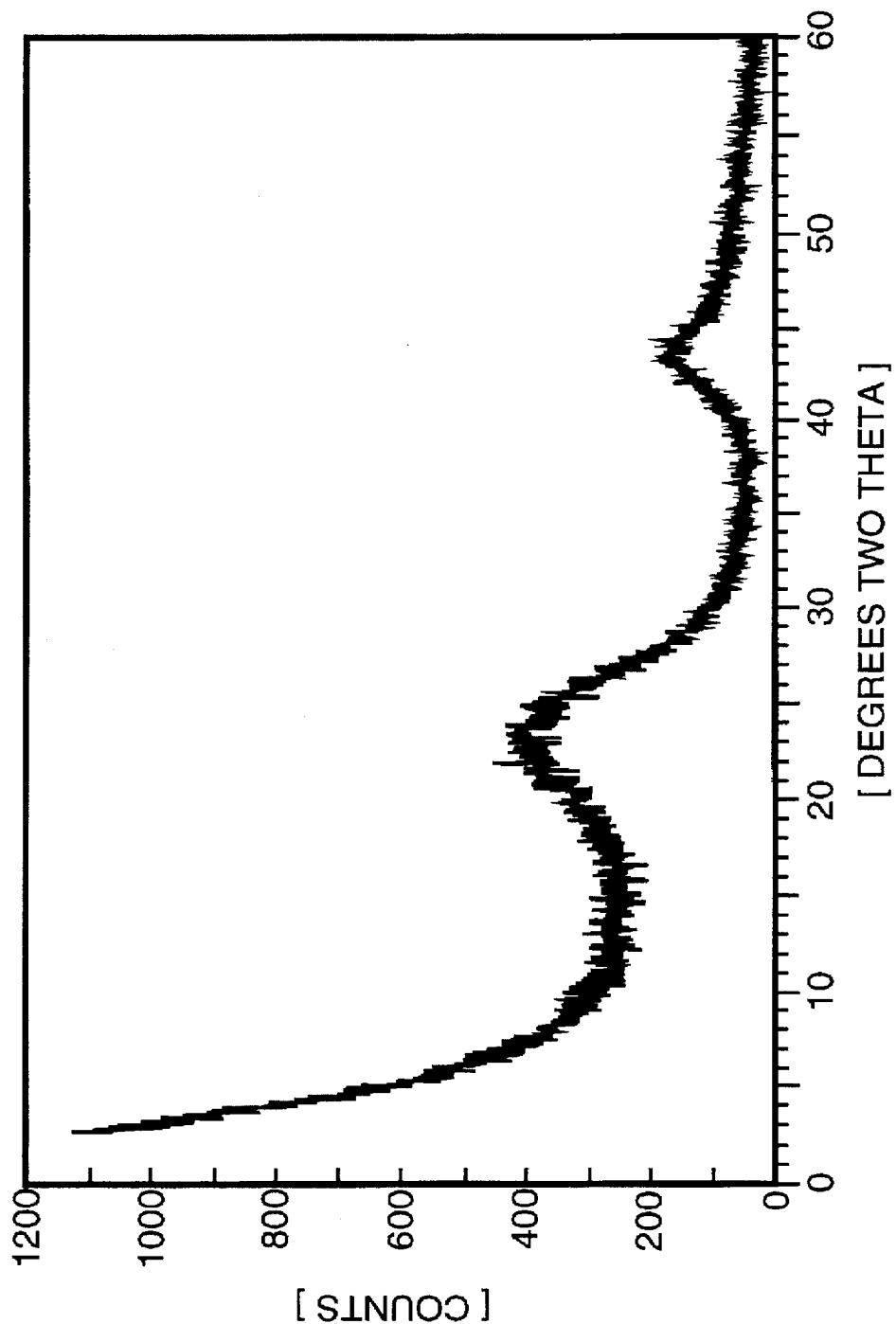
FIG. 10 is a X-ray diffraction pattern of an eighth amorphous carbon electrode material, in accordance with the instant invention.

Dimethyl terephthalate (19.4 g), pentaerythritol powder (6.80 g), and p-toluenesulfonic acid (1.94 g) were mixed and placed in a ceramic crucible. After heating at 80° C. for about 30 minutes, the mixture became a viscous liquid. The liquid was subsequently cured at 130° C. for 12 hours. The cured polymer was carbonized according to the following heating program in an inert gas atmosphere of argon: (1) 130° C. to 600° C. at 0.5° C./min; (2) from 600° C. to 1100° C. at 10° C./min; (4) hold at 1100° C. for 1 hour. 4.05 g of carbon was collected. FIG. 10 is an X-ray diffraction pattern for the material of this example, and shows a (002) peak centered at 3.83 Å. FIG. 10 also shows an intensity peak ratio of $$\frac{I_{(002)}}{I_{(100)}}$$

of 2.38. The reversible lithium intercalation capacity of the material was 330 mAh/g.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrode for an electrochemical cell, said electrode consisting of a carbon material being a pyrolytic by-product of at least a first and a second multifunctional organic monomer, and characterized by an X-ray difraction pattern in which the d-spacing of the (002) plane is between 3.89 and 4.20 Å.

2. An electrode as in claim 1, wherein said first multifunctional organic monomer is selected from the group of materials having the formulas:

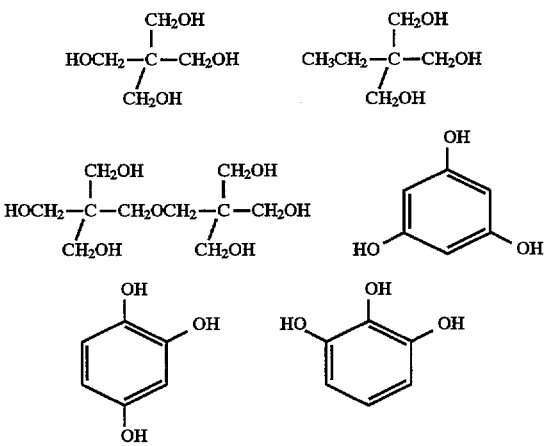

3. An electrode as in claim 1, wherein said second multifunctional organic monomer is selected from the group of materials having the formulas:

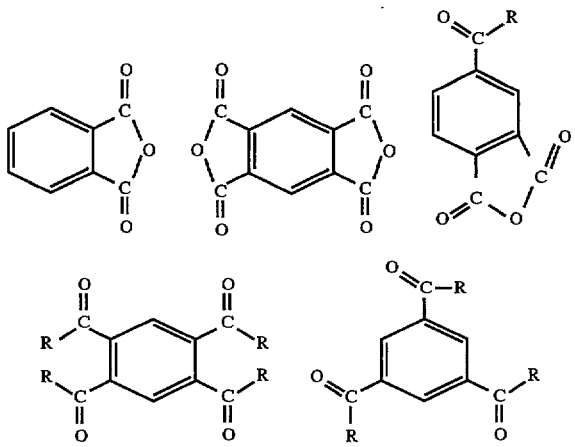

-continued

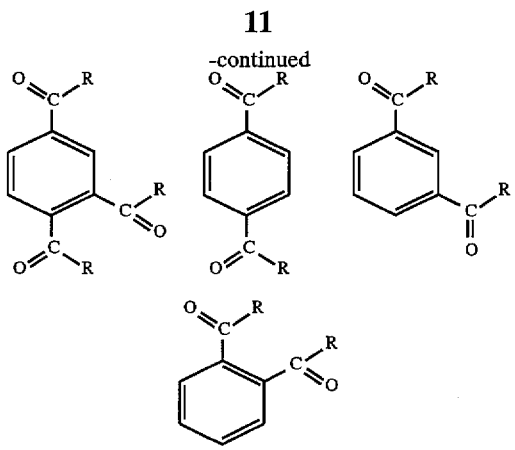

where R is selected from the groups of Cl, OH, H, $OC_nH_{2n+1}$, wherein n=1 to 10, and combination thereof.

4. An electrode as in claim 1, wherein said carbon material is amorphous.

5. An electrode as in claim 1, wherein said electrode is further characterized in that the ratio of the peak at (002) to that at (100) is between 1 and 5.

6. An electrode as in claim 5, wherein said ratio is between about 2.25 and 2.75.

* * * * *